US011557817B2

(12) United States Patent
Wang et al.

(10) Patent No.: US 11,557,817 B2
(45) Date of Patent: Jan. 17, 2023

(54) LATERAL-WELD SOFT CONNECTOR HAVING POLE COLUMN

(71) Applicant: CHANGZHOU RED FAIRY PRECISION TECHNOLOGY CO., LTD., Jiangsu (CN)

(72) Inventors: Yousheng Wang, Guangdong (CN); Chaoyang Ding, Guangdong (CN); Kun Ding, Guangdong (CN)

(73) Assignee: CHANGZHOU RED FAIRY PRECISION TECHNOLOGY CO., LTD., Jiangsu (CN)

( * ) Notice: Subject to any disclaimer, the term of this patent is extended or adjusted under 35 U.S.C. 154(b) by 351 days.

(21) Appl. No.: 16/617,308

(22) PCT Filed: Apr. 4, 2018

(86) PCT No.: PCT/CN2018/081944
§ 371 (c)(1),
(2) Date: Nov. 26, 2019

(87) PCT Pub. No.: WO2019/104928
PCT Pub. Date: Jun. 6, 2019

(65) Prior Publication Data
US 2021/0126326 A1   Apr. 29, 2021

(30) Foreign Application Priority Data
Nov. 28, 2017  (CN) .......................... 201721619729.2

(51) Int. Cl.
*H01M 50/536*   (2021.01)
*H01M 10/052*   (2010.01)
*H01M 50/553*   (2021.01)

(52) U.S. Cl.
CPC ....... *H01M 50/536* (2021.01); *H01M 10/052* (2013.01); *H01M 50/553* (2021.01); *H01M 2220/30* (2013.01)

(58) Field of Classification Search
None
See application file for complete search history.

(56) References Cited

U.S. PATENT DOCUMENTS

| 9,083,039 | B2 | 7/2015 | Kim |
| 9,601,781 | B2 | 3/2017 | Ikeda et al. |

(Continued)

FOREIGN PATENT DOCUMENTS

| CN | 205406620 U | 7/2016 |
| CN | 106207276 A | 12/2016 |

(Continued)

OTHER PUBLICATIONS

Machine Translation of WO 2014/001042 A1, provided by Google Translate (Year: 2014).*

(Continued)

*Primary Examiner* — Robert S Carrico
(74) *Attorney, Agent, or Firm* — Cantor Colburn LLP

(57) ABSTRACT

The present application relates to the technical field of lithium batteries. Disclosed is a lateral-weld soft connector having a pole column. The connector comprises a first connector, which a top end face configured to face upward; a pole column which extends upwards protrudes out of the top end face of the first connector; a second connected extending outwards and connected to a cell is provided at one side of the first connector; the second connector is bent downwards with respect to the first connector and is disposed at a side edge of the cell.

4 Claims, 2 Drawing Sheets

(56) References Cited

U.S. PATENT DOCUMENTS

2014/0193696 A1* 7/2014 Kim .................... H01M 50/543
                                                         429/178
2017/0155257 A1* 6/2017 Kim .................... H01M 50/502

FOREIGN PATENT DOCUMENTS

| CN | 206076365 U | 4/2017 |
|----|-------------|--------|
| CN | 206388772 U | 8/2017 |
| CN | 207459058 U | 6/2018 |
| DE | 112013003756 | 4/2015 |
| EP | 2645453 A1 | 10/2013 |
| WO | 2014001042 A1 | 1/2014 |

OTHER PUBLICATIONS

English Machine Translation for CN206388772 Abstract.
English Machine Translation for CN207459058 Abstract.
English Machine Translation of CN20540662 Abstract.
English Machine Translation to CN206076365 Abstract.
Internationational Search Report for Application No. PCT/CN2018/081944.
European Search Report for Application No. 18 88 2858.

* cited by examiner

LATERAL-WELD SOFT CONNECTOR HAVING POLE COLUMN

CROSS-REFERENCE TO RELATED APPLICATIONS

This application is a national phase application under 35 U.S.C. § 371 of International Patent Application No. PCT/CN2019/081944 filed on Apr. 4, 2018, which claims priority to Chinese Patent Application No. 201721619729.2 filed on Nov. 28, 2017, the contents each of which are incorporated herein by reference thereto.

TECHNICAL FIELD

The present application relates to the technical field of lithium batteries, and in particular to a lateral-weld-type flexible connecting piece with a pole pillar.

BACKGROUND

At present, with electronic products increasing miniaturization, lightweight and portability, such as cameras, notebooks and mobile phones etc., the driving power source of these electronic products is also developing toward high capacity, high security and lightweight. Lithium batteries are widely applied in the electronic products due to their excellent characteristics such as high capacity and the like.

The lithium battery includes a casing, a top cover, a battery core and the like, here the battery core is arranged inside the casing, an upper end of the casing is provided with an upper opening, and the top cover seals the opening at the upper end of the casing. The top cover is provided with a conductive block, and the conductive block is provided with a pole pillar passing through the top cover, and the conductive block is electrically connected to the battery core through a flexible connecting piece.

In the prior art, the conductive block provided with a pole pillar is required to be specially arranged, and then the conductive block is electrically connected to the battery core by using a flexible connecting piece, thus the overall structure is complicated and results in high cost.
Technical Problems The lateral-weld-type flexible connecting piece with a pole pillar provided by the present application aims to solve the problems in the art that the structure of the lithium battery is complicated and the cost of the lithium battery is high.

SUMMARY

The present application is achieved in a way of a lateral-weld-type flexible connecting piece with a pole pillar. The lateral-weld-type flexible connecting piece includes a first connecting piece provided with a top end face arranged upward, the top end face of the first connecting piece is protruded with a pole pillar extending upward, a side of the first connecting piece extends outward and is provided with a second connecting piece connected with a battery core, and the second connecting piece is bent downward with respect to the first connecting piece and is arranged at a side of the battery core.

Further, the top end face of the first connecting piece is protruded with a convex block, the convex block forms the pole pillar, and a binding post is protruded from a top of the pole pillar.

Further, a solder bump is protruded from the top of the convex block.

Further, two solder bumps are protruded from the top of the convex block.

Further, the two solder bumps are respectively distributed on two sides of a binding post.

Further, the first connecting piece is provided with a bottom end face that faces away from the top end face, and the bottom end face of the first connecting piece is provided with a hollow region arranged with an upward depression.

Further, the hollow region and the pole pillar are arranged in an up-and-down alignment.

Further, the hollow region extends upward to inside of the pole pillar.

Further, an outer contour of the hollow region is similar to that of the pole pillar, and the hollow region is arranged within an enclosing range of the pole pillar.

Further, the pole pillar and the first connecting piece are formed in one piece.
Beneficial Effects Compared with the prior art, regarding the lateral-weld-type flexible connecting piece with a pole pillar provided the present application, the top end face of the first connecting piece is protruded with the pole pillar, such thus it is not necessary to separately arrange a pole pillar at a position corresponding to the first connecting piece in the lithium battery, and the pole pillar on the first connecting piece may be directly used to pass through the top cover, thereby greatly simplifying the structure of the lithium battery and greatly reducing the cost of the lithium battery.

EMBODIMENTS OF THE APPLICATION

Figure 1:
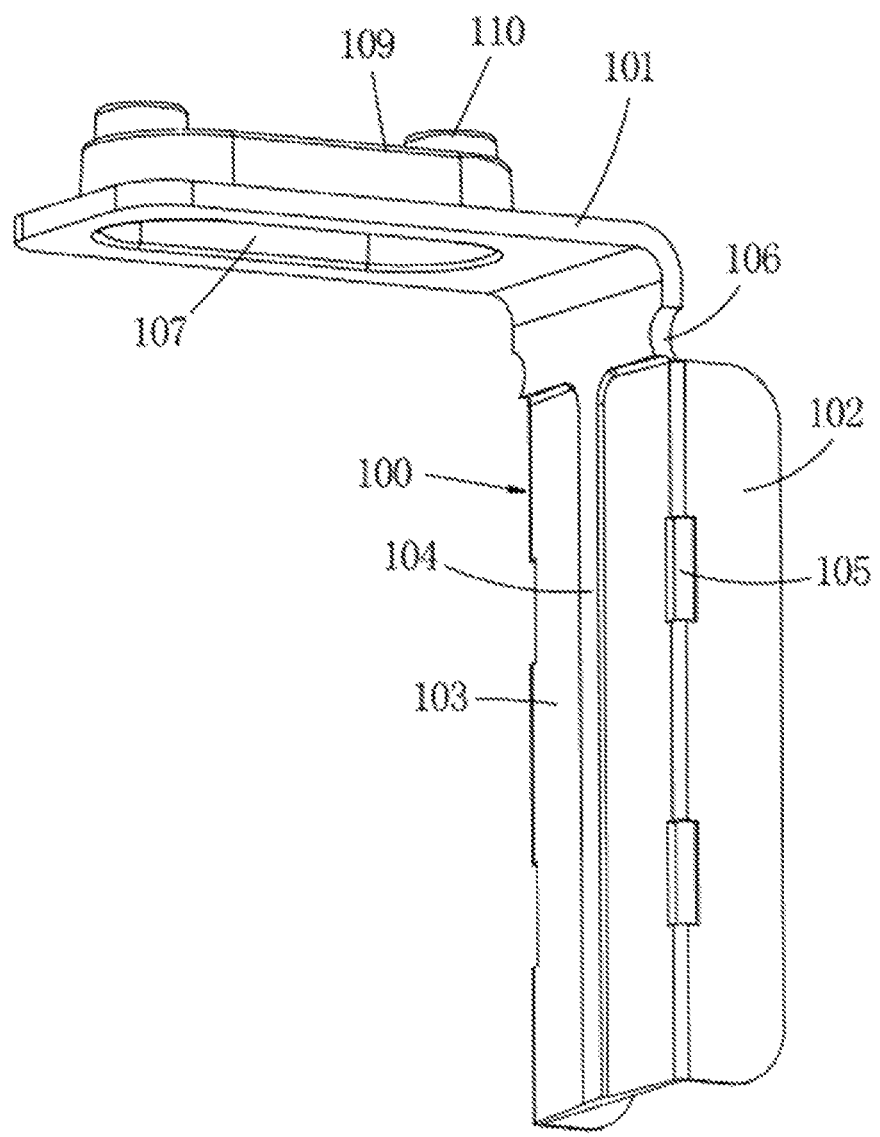
FIG. 1 is a stereoscopic schematic diagram of the lateral-weld-type flexible connecting piece with a pole pillar provided by an embodiment of the present application.

In order to make the objectives, technical solutions and advantages of the present application more comprehensible, the present application will be further described in detail below with reference to the accompanying drawings and embodiments. It should be understood that the specific embodiments described herein are merely to illustrate the present application and are not intended to limit the present application.

The implementations of the present application will be described in detail below with reference to specific embodiments.

The same or similar reference numerals in the drawings of the present embodiments correspond to the same or similar components. In the description of the present application, it should be understood that the orientation or position relationship indicated by the term such as "upper", "lower", "left", "right" or the like is based on the orientation or position relationship as shown in the drawings, which is merely to facilitate the description of the present application and simplification of the description, rather to indicate or imply that an indicated device or element have to be provided with a specific orientation or be constructed or operated at a specific orientation. Therefore, the terms describing position relationships in the drawings are only used for exemplary illustration, and are not to be construed as limitation to the present application. For those of ordinary skill in the art, the specific meaning of the above terms may be understood on a case-by-case basis.

Figure 2:
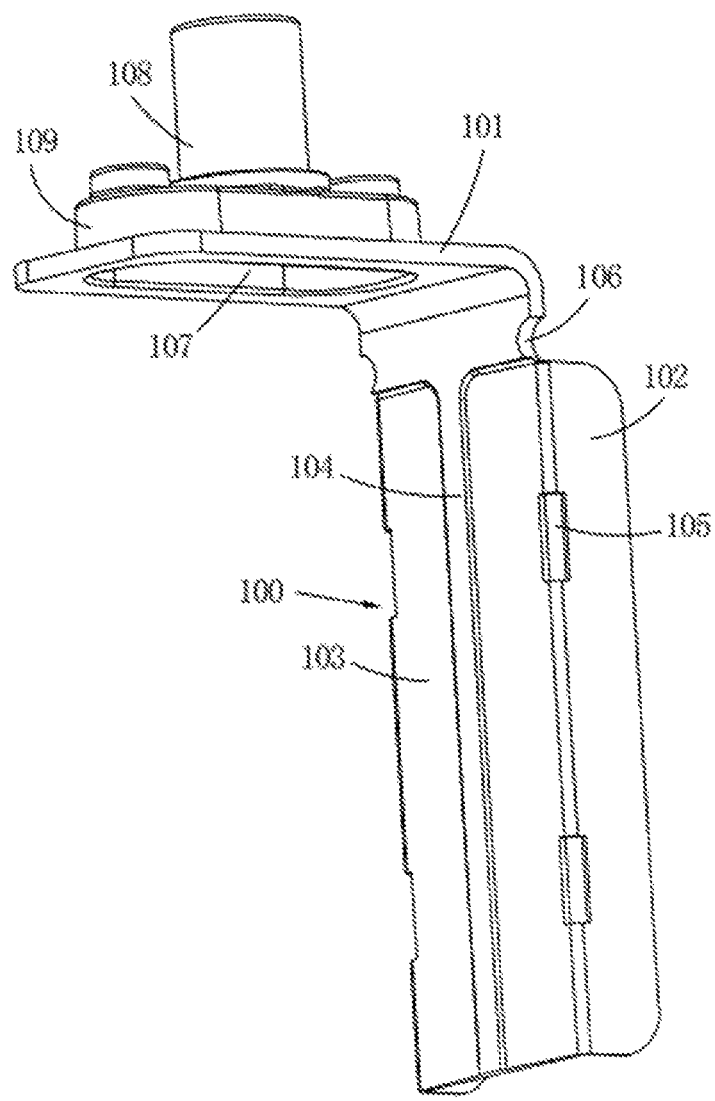
FIG. 2 is a stereoscopic schematic diagram of the lateral-weld-type flexible connecting piece with a pole pillar provided by an embodiment of the present application, with the lateral-weld-type flexible connecting piece provided with a binding post.

Referring to FIGS. 1-2, a preferred embodiment of the present application is provided.

The lateral-weld-type flexible connecting piece with a pole pillar provided by the present application is applied in a lithium battery, and of course may also be used in other types of batteries, which is not limited to the embodiments.

The lateral-weld-type flexible connecting piece with a pole pillar in an embodiment includes a first connecting piece 101 provided with a top end face arranged upward, and the top end face of the first connecting piece 101 is protruded with a pole pillar 109 extending upward. In actual assembly, the pole pillar 109 of the first connecting piece 101 passes through a top cover. A side of the first connecting piece 101 extends outward and is provided with a second connecting piece 100, the second connecting piece 100 is configured to connect with a battery core, and the second connecting piece 100 is bent downward with respect to the first connecting piece 101 and is arranged at a side of the battery core.

Regarding the lateral-weld-type flexible connecting piece with a pole pillar provided above, the top end face of the first connecting piece 101 is protruded with the pole pillar 109, such thus it is not necessary to separately arrange a pole pillar 109 at a position corresponding to the first connecting piece 101 in the lithium battery, and the pole pillar 109 on the first connecting piece 101 may be directly used to pass through the top cover, thereby greatly simplifying the structure of the lithium battery and greatly reducing the cost of the lithium battery.

In an embodiment, the top end face of the first connecting piece 101 is protruded with a convex block, and the convex block forms the above-mentioned pole pillar 109. Referring to FIG. 2, a binding post 108 is protruded from the top of the pole pillar 109, and the binding post 108 may be configured to connect with an external element to achieve connection between the lithium battery and the external element.

A solder bump 110 is protruded from the top of the convex block, so as to facilitate soldering of the first connecting piece 101. In an embodiment, the convex block is arranged with two solder bumps 110, and the two solder bumps 110 are distributed on two sides of the binding post 108, so that the connection of the first connecting piece 101 is more stable after soldering.

In an embodiment, the first connecting piece 101 is provided with a bottom end face that faces away from the top end face, and the bottom end face of the first connecting piece 101 is provided with a hollow region 107 arranged with an upward depression. Through providing the hollow region 107, weight reduction of the flexible connecting piece can be realized, so as to achieve weight reduction of the lithium battery.

Specifically, the hollow region 107 and the pole pillar 109 are arranged in an up-and-down alignment, so that the problem that the arrangement of the hollow region 107 affects the strength of the first connecting piece 101 will be avoided. Moreover, the hollow region 107 extends upward to inside of the pole pillar 109. Preferably, an outer contour of the hollow region 107 is similar to that of the pole pillar 109, and the hollow region 107 is arranged within an enclosing range of the pole pillar 109.

In an embodiment, the first connecting piece 101 and the pole pillar 109 are integrally formed by piercing, or may be integrally formed by other processes.

Two sides of a joint between the first connecting piece 101 and the second connecting piece 100 are respectively arranged with a notch 106, so that the weight can be further reduced without affecting the connection strength.

In an embodiment, the second connecting piece 100 is provided with an inner end face facing toward the battery core, and the inner end face of the second connecting piece 100 is provided with a groove 103.

As a preferred embodiment, the groove 103 is arranged in a striped-like shape and extends to a lower portion of the second connecting piece 100, so that the size of the groove 103 can be maximized to further achieve the effect of weight reduction. Moreover, the inner end face of the second connecting piece 100 is provided with two grooves 103 described above, and the two grooves 103 are spaced apart.

The two grooves 103 are arranged apart, and a rib 104 is formed between the two grooves 103, so that the strength requirement of the second connecting piece 100 can be ensured by using the rib 104 on the basis of the groove 103.

In an embodiment, a side of the second connecting piece 100 extends outward and is provided with a clamping piece 102, and the second connecting piece 100 is connected to the battery core by using the clamping piece 102. Further, a side edge of the clamping piece 102 is inclined, so that the weight of the lateral-weld-type flexible connecting piece having the pole pillar is further reduced without affecting the connection performance of the clamping piece 102.

The clamping piece 102 is connected to the side of the second connecting piece 100, the clamping piece 102 may swing with respect to the second connecting piece 100, and a through hole 105 is provided at a joint between the clamping piece 102 and the second connecting piece 100, such that the swing between the clamping piece 102 and the second connecting piece 100 may be more flexible, and the weight reduction effect can be further achieved.

The above description only describes preferred embodiments of the present application, and is not intended to limit the present application, and any modifications, equivalent substitutions and improvements made within the spirit and principles of the present application should be included in the protection scope of the present application.

What is claimed is:

1. A lateral-weld-type flexible connecting piece with a pole pillar, comprising:
    a first connecting piece provided with a top end face arranged upward, wherein a portion of the top end face of the first connecting piece is protruded upwardly from other portions of the top end face with a convex block, the convex block forming a pole pillar, the first connecting piece is provided with a bottom end face that faces away from the top end face, and the convex block forms a hollow region arranged with an upward depression, wherein the hollow region and the pole pillar are arranged in an up-and-down alignment such that the hollow region extends upwardly into an inside of the pole pillar from the bottom end face and wherein an outer contour of the hollow region is similar to a contour of the pole pillar, and the hollow region is arranged within an enclosing range of the pole pillar, wherein the pole pillar and the first connecting piece are formed in one piece;
    a binding post protruding upwardly from a top of the pole pillar; and
    a side of the first connecting piece extends outward and is provided with a second connecting piece connected with a battery core, and the second connecting piece is bent downward with respect to the first connecting piece and is arranged at a side of the battery core.

2. The lateral-weld-type flexible connecting piece according to claim 1, wherein a solder bump is protruded from the top of the convex block.

3. The lateral-weld-type flexible connecting piece according to claim 2, wherein two solder bumps are protruded from the top of the convex block.

4. The lateral-weld-type flexible connecting piece according to claim 3, wherein the two solder bumps are respectively distributed on two sides of the binding post.

* * * * *